US010114657B2

(12) United States Patent
Jenkins et al.

(10) Patent No.: US 10,114,657 B2
(45) Date of Patent: *Oct. 30, 2018

(54) MEMORY INTERFACE INITIALIZATION WITH PROCESSOR IN RESET

(71) Applicant: Western Digital Technologies, Inc., Irvine, CA (US)

(72) Inventors: Dean Mitcham Jenkins, La Canada-Flintridge, CA (US); Dale C. Main, La Canada-Flintridge, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,165

(22) Filed: Jan. 18, 2018

(65) Prior Publication Data

US 2018/0143841 A1    May 24, 2018

Related U.S. Application Data

(63) Continuation of application No. 14/675,531, filed on Mar. 31, 2015, now Pat. No. 9,886,285.

(51) Int. Cl.
*G06F 12/00* (2006.01)
*G06F 9/4401* (2018.01)
*G06F 3/06* (2006.01)

(52) U.S. Cl.
CPC ............ *G06F 9/4408* (2013.01); *G06F 3/065* (2013.01); *G06F 3/0619* (2013.01); *G06F 3/0625* (2013.01); *G06F 3/0679* (2013.01); *G06F 9/4403* (2013.01); *G06F 2206/1014* (2013.01)

(58) Field of Classification Search
CPC .... G06F 9/4408; G06F 3/0679; G06F 9/4403; G06F 3/0619; G06F 3/065; G06F 3/0625; G06F 2206/1014
See application file for complete search history.

(56) References Cited

U.S. PATENT DOCUMENTS

| | | | | |
|---|---|---|---|---|
| 2002/0144115 | A1* | 10/2002 | Lemay | G06F 21/51 713/168 |
| 2009/0254776 | A1* | 10/2009 | Gonzalez | G06F 11/1068 714/6.12 |
| 2012/0191964 | A1* | 7/2012 | Lee | G06F 11/2284 713/2 |
| 2014/0089573 | A1* | 3/2014 | Sakthikumar | G06F 13/1689 711/105 |
| 2014/0279759 | A1* | 9/2014 | Yang | G06F 3/0671 706/12 |
| 2014/0372670 | A1* | 12/2014 | Vasilyuk | G06F 12/0246 711/103 |

* cited by examiner

*Primary Examiner* — Alan Otto
(74) *Attorney, Agent, or Firm* — Chang & Hale LLP

(57) ABSTRACT

A device comprises control circuitry including a processor, a memory interface, memory interface initialization circuitry, and non-volatile storage storing initialization parameters for initializing the memory interface. The control circuitry is configured to, while the processor is held in reset, initialize the memory interface using the initialization parameters and the memory interface initialization circuitry, after the memory interface has been initialized, receive instructions from a non-volatile memory module over the memory interface, and, after the processor has been released from reset, execute the instructions using the processor.

20 Claims, 4 Drawing Sheets

MEMORY INTERFACE INITIALIZATION WITH PROCESSOR IN RESET

RELATED APPLICATION

This application is a continuation of U.S. patent application Ser. No. 14/675,531, filed on Mar. 31, 2015, entitled COMMUNICATION INTERFACE INITIALIZATION, the disclosure of which is hereby incorporated by reference in its entirety.

BACKGROUND

In computing devices and/or systems, firmware may be copied to a memory module for execution therefrom by one or more processors. Communication between processors and memory modules may require initialization of a communication interface configured to facilitate such communication.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
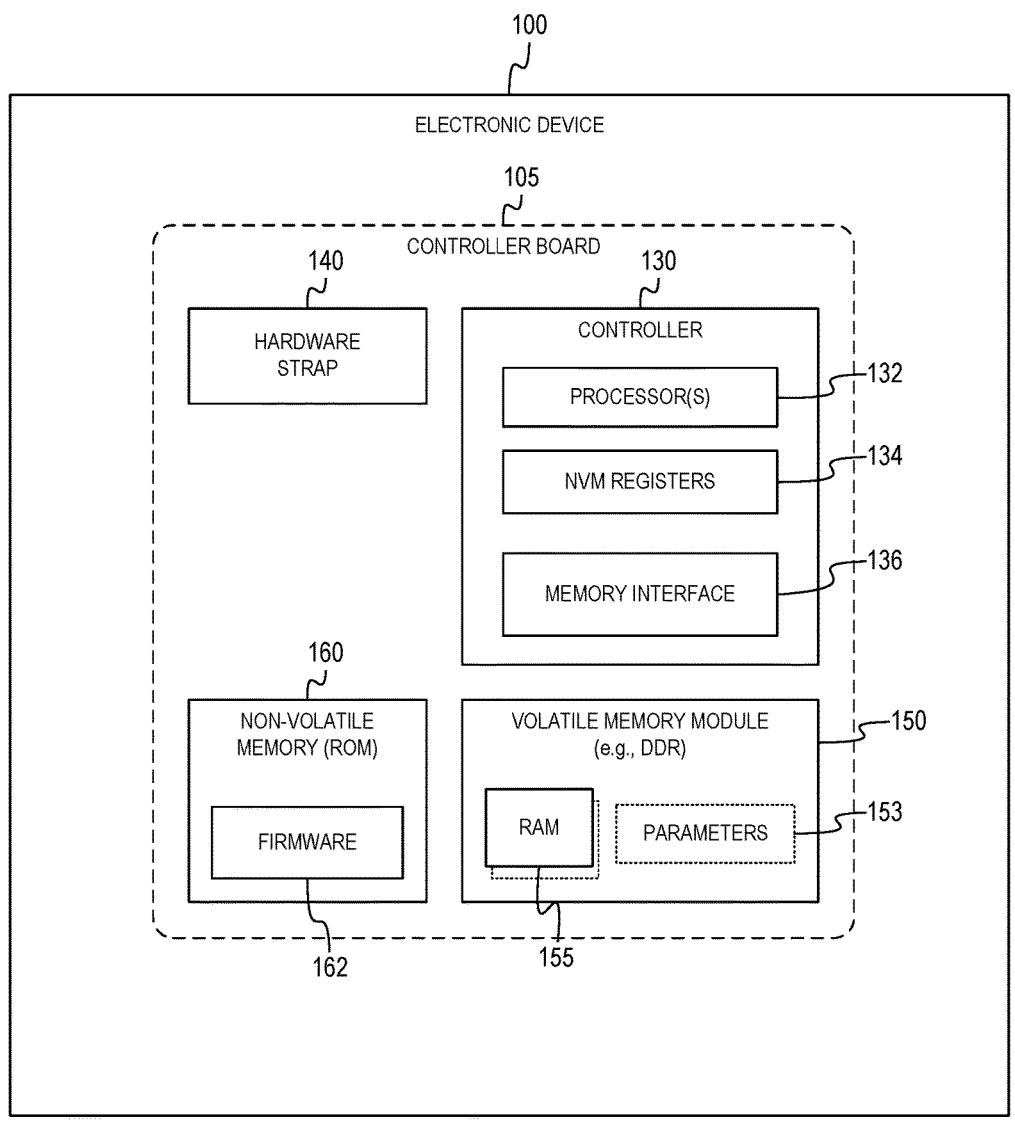
FIG. 1 is a block diagram of an electronic device according to an embodiment.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to direct execution of firmware from an interface-connected non-volatile memory module.

Overview

In electronic devices, initial boot-up processes may cause one or more processors to execute boot loader code from, for example, an internal non-volatile memory (e.g., read only memory (ROM)). Boot-up processes may further involve transitioning to a vector directed at least in part by external bootstrap options and further reading from a specific boot device (e.g., serial peripheral interface (SPI) flash) to load additional boot loader code and/or device firmware. The external code provided by the boot device may include certain initialization parameters for "training" a communication interface (e.g., double data rate (DDR) interface) allowing the controller of the device to communicate with one or more additional peripheral/external memory modules (e.g., volatile DDR memory). Booting and initialization from a specific boot device (e.g., SPI flash) may therefore require a boot interface and boot flash chip in addition to memory to build a system, which can introduce cost and/or design issues.

With the advent of non-volatile memory (NVM) that utilizes DDR interfaces, it may be desirable in certain systems/devices to boot a processor directly from a device attached to a DDR interface or other interface for communicating with non-volatile memory external to the device controller (e.g., SoC). Generally, a DDR interface may need to be trained according to implementation-specific initialization parameters in order to allow for proper functioning. As disclosed in detail herein, adding non-volatile parameter storage in addition to a particularly-configured hardware training state machine to a device controller can allow the hardware to train the DDR interface without requiring initialization parameters and/or code to be fetched from a peripheral device. Once the DDR interface is trained, the processor(s) may be able to boot from the non-volatile memory module attached to the DDR interface, rather than requiring code to be fetched from an internal boot ROM or external serial flash device, for example.

According to certain embodiments, initialization parameters and/or boot code that would otherwise be stored in an external specific boot device may be maintained in non-volatile hardware devices of the device controller. The controller may further include a hardware state machine that is configured to read the parameters and perform interface training based thereon; the parameters may be used to seed the interface (e.g., DDR) to enable training of the interface.

Certain embodiments disclosed herein, by providing for booting directly from a non-volatile DDR module, may allow for elimination of one or more devices or components that may otherwise be required for booting and/or interface initialization, thereby potentially providing substantial cost savings, as well as reduced size/area requirements. Furthermore, embodiments disclosed herein may provide for initialization/training of communication interface(s) without requiring execution of any code by device/system processor(s). In certain embodiments, the first code that is executed by processor(s) in connection with booting of a computing device is from a DDR-attached module/device pre-loaded with the necessary code.

System Overview

FIG. 1 is a block diagram illustrating an electronic device 100 according to one or more embodiments disclosed herein. The electronic device 100 may be a computing device or any other electronic device. For example, in certain embodiments, the electronic device 100 may be a data storage device configured to provide data storage services to a host system (not shown).

The electronic device 100 includes a plurality of components, some of which are illustrated in the diagram of FIG. 1. In certain embodiments, one or more of the illustrated components may be mounted to, or otherwise associated with, one or more controller boards 105, which may be, for example, printed circuit boards (PCBs). In such a configuration, the controller board(s) 105 and the one or more components mounted thereto or associated therewith may be referred to herein as a printed circuit board assembly (PCBA).

The controller 130 may be a single chip or module, such as a system on a chip (SoC). In certain embodiments, the controller 130 includes one or more processors 132. For example, the one or more processors 132 may be microprocessors. In certain embodiments, the controller 130 may further comprise one or more hardware registers 134, which may be configured to store data.

The controller 130 may be configured to communicate with one or more other components of the controller board 105 and/or electronic device 100. To facilitate such communication, the controller 130 may comprise one or more communication interfaces. For example, the controller 130 may include a memory interface 136 for communicating with a memory module, such as the volatile memory module 150. In certain embodiments, volatile memory module 150 may be configured to communicate over a double data rate (DDR) interface.

The volatile memory module 150 may comprise one or more volatile memory chips 155, such as random access memory (RAM) chips. The volatile memory module 150 may further comprise a serial presence detect (SPD) chip configured to store one or more parameters 153 associated with the volatile memory module 150. For example, the parameters 153 may define one or more attributes of the memory chip(s) 155, such as timing, physical layout, chip number and/or configuration, trace length, tolerances, or the like. In certain embodiments, the volatile memory module 150 is not connected through a connector slot, but is hardwired to the controller board. Furthermore, in certain embodiments, the controller 130 is preprogrammed with the necessary parameters of the volatile memory module 150, such that no retrieval of parameters from the volatile memory module 150 is necessary.

In order for the controller 130 to communicate with the volatile memory module 150 over the interface 136, it may be necessary for the interface to be first initialized and/or trained. Therefore, in order to communicate with the volatile memory module 150, the controller 130 may access or otherwise acquire initialization parameters associated with the interface 136 and perform initialization/training using such parameters.

In certain embodiments, the controller 130 may acquire the initialization parameters for initializing the interface 136 from one or more non-volatile memory modules, such as the non-volatile memory 160, which may be, for example, a serial peripheral interface (SPI) flash memory module, wherein the memory 160 stores boot code for booting the electronic device and/or firmware for execution by the controller in operating the electronic device 100. The controller 130 may be further configured to communicate with hardware strap circuitry 140, which may provide certain system configuration data. The hardware strap circuitry 140 may comprise one or more pins that may be strapped up or down via a hardware resistor or the like, wherein the controller 130 is configured to read the pins and configure functionality based thereon. The hardware strap data may be read prior to execution of firmware controlled mechanisms.

With respect to the electronic device 100, there may be various methods for code booting the processor(s) 132 selected by bootstrap options. For example, booting may be implemented from a parallel bus NOR flash device with a chip select, from a serial flash device via an SPI interface, or from an external device. With the advent of non-volatile memories incorporating DDR interfaces for speed, the opportunity arises to also boot from such external non-volatile DDR devices. However, in order to boot from an external DDR memory, it may be necessary for the controller 130 to first initialize the peripheral interface associated with the memory.

Certain embodiments disclosed herein provide for the inclusion of a set of programmable non-volatile registers, or other internal hardware non-volatile memory, for storing the DDR training parameters, as well as a state machine (not shown) that may be used to perform the training. Such a configuration may obviate the need to fetch any code from external memory in order to initialize the interface. Therefore, the processor(s) 132 may be able to boot from a non-volatile memory module attached to the DDR interface. Furthermore, maintaining the initialization parameters within a separate non-volatile register array may allow for custom programming for a specific design or layout. Thus, with these parameters separate from the controller's internal boot loader memory chip, the device may be programmable to various different DDR layouts. It should be understood that the initialization parameters for initialization of the memory interface 136, as described herein, may be separate from the SPD parameters 153 shown.

As described, the use of a non-volatile DDR memory for booting may eliminate the need for a separate boot interface and boot device. Furthermore, the non-volatile DDR memory may also replace the need for a separate volatile DDR memory for use as main memory (e.g., DRAM), thereby providing a system having minimal circuitry/components.

Figure 2:
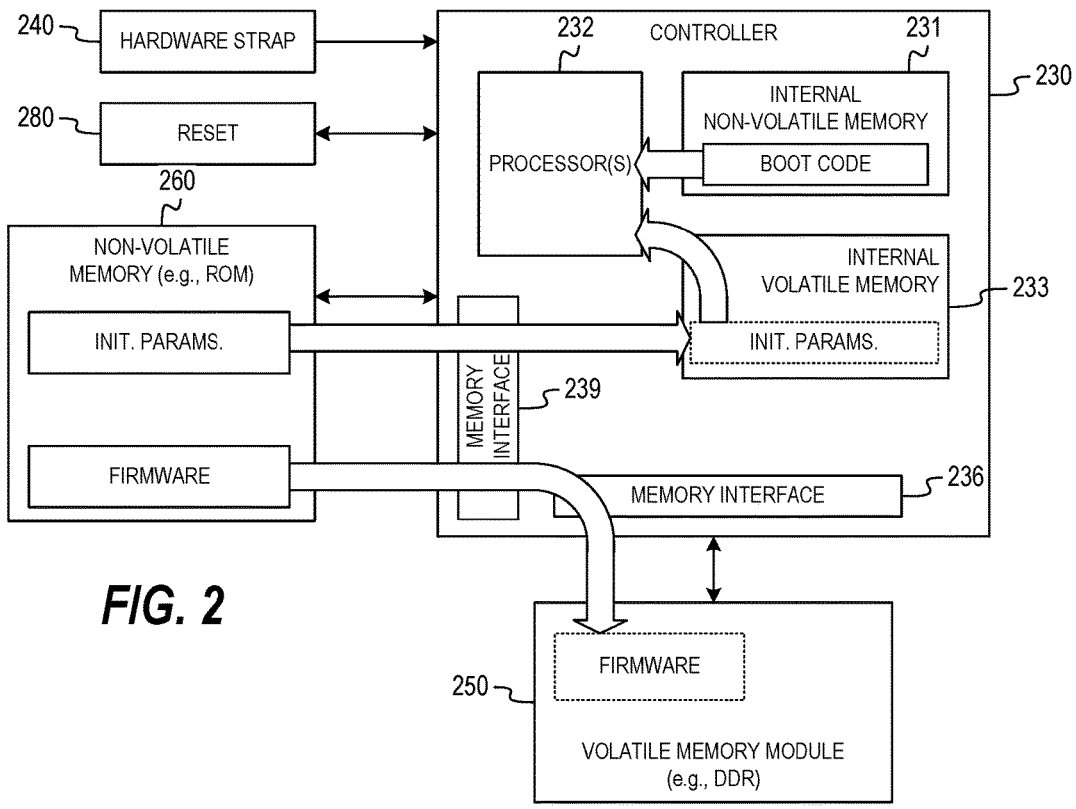
FIG. 2 is a block diagram of a computing or electronic device according to an embodiment.

FIG. 2 is a more detailed block diagram of a computing or electronic device, and may correspond in certain respects to the electronic device 100 shown in FIG. 1 and described above. The device of FIG. 2 includes a controller 230 which comprises one or more processors 232, such as microprocessors or the like. The controller 230 may further include one or more internal non-volatile memory modules 231 and/or internal volatile memory modules 233. For example, the internal non-volatile memory 231 may comprise a read only memory (ROM) configured to store certain boot code or other code that is desirable to be maintained by the controller in a persistent manner.

The controller may be configured to fetch boot code from the internal non-volatile memory 231, as well as additional boot code from the non-volatile memory 260. By retrieving code from the internal memory 231 and/or the external memory 260, the controller 130 may be able to implement hardware initialization under firmware control. For example, the controller 130 may implement initialization and/or training of the memory interface 236 under firmware control.

The internal volatile memory 231 may be, for example, SRAM, or other type of volatile memory. In certain embodiments, the internal volatile memory 233 may be utilized by the controller 230 for the purpose of caching code and/or data utilized by the one or more processors 232.

The memory interface 236 may comprise a physical communication interface for communicating with one or more memory modules external to the controller 230, such as the volatile memory module 250. The volatile memory module 250 may be, for example, DDR DRAM, and may be used as main memory by the controller 230. The volatile memory module 250 may comprise one or more volatile memory chips.

The controller 230 may be configured to communicate with hardware strap circuitry 240, and obtain therefrom certain configuration data for initializing/configuring the controller 230 and/or one or more components thereof. The hardware strap circuitry 240 may comprise straps/pins that are sensed by the controller 230 and latched into data storage registers of the controller. The device hardware may use the information in the registers to configure itself, such as by enabling/disabling communication ports, or the like.

The device of FIG. 2 may further comprise one or more reset lines 280, which may be communicatively coupled to the one or more processors 232, and allow the system to hold one or more of the processor(s) 232 in reset. In certain embodiments, the processor(s) 232 are held in reset until the reset line 280 is released.

The non-volatile memory 260 may be coupled to the controller 230 over an interface 239, such as a serial peripheral interface bus (SPI) interface. In certain embodiments, the non-volatile memory is a NOR boot flash, and may be an 8-pin chip, for example, having both power and data pins.

On startup, as mentioned above, the controller 230 may first reference data provided by the hardware strap circuitry 240. The controller 230 may then load and execute boot code stored in the internal non-volatile memory 231. In order to execute the code, the processor(s) may be released from reset and enter an active state. The controller 230 may then load and execute boot code stored in the internal non-volatile memory 231. Once the boot code has caused the hardware to be initialized in a known state, the controller 230 may be able to communicate with the memory interface 236. For example, the processor(s) 232 may be utilized to initialize the memory interface 239 for communicating with the non-volatile memory 260. The boot code from the internal non-volatile memory 231 may be used to configure the interface 239 (e.g., SPI) for communicating with the non-volatile memory 260. The boot code stored in the internal non-volatile memory 231 may be considered first stage boot loader code.

According to the boot code loaded from the internal non-volatile memory 231, the controller may be directed to load certain information from the non-volatile memory 260, such as second stage boot loader code and/or initialization parameters for initializing a memory interface 236 of the controller 230. As an alternative, in certain embodiments, all of the boot loader code may be maintained in the internal non-volatile memory 231, as well as the firmware image, such that the non-volatile memory 260 may not be necessary for such purpose.

The initialization parameters stored in the non-volatile memory 260 may be copied to the internal volatile memory (e.g., SRAM) 233 by the controller 230 and executed therefrom. The initialization parameters may provide information for initializing and/or training the memory interface 236 by the processor(s) 232.

Once memory interface 236 has been initialized and/or trained, the controller 230 may be configured to load firmware from the non-volatile memory 260, such as a firmware image, to the volatile memory module 250, wherein the volatile memory module 250 provides main memory, or system memory, for the device or system. That is, the controller 230 may be configured to execute the firmware stored in volatile memory module 250 in operating the system and/or device.

Direct Execution of Firmware from External Non-Volatile Memory

The various components of the system of FIG. 2 may individually and/or collectively introduce cost and/or space/design complexity. Therefore, it may be desirable to eliminate one or more components from the system to advantageously save cost and/or space. Certain embodiments disclosed herein provide a computing or electronic device including a single memory device for both booting and execution. Such a solution may allow for the elimination of a specific boot interface, which may save pin count and/or reduce the package size of the controller 230 or other component(s). In addition, solutions disclosed herein may allow for reduced hardware and/or software system complexity. Furthermore, certain embodiments maintain the programmable interface initialization parameters separate from the boot loader code, which may allow the device to be tailored to the environment for which it is intended.

Figure 3:
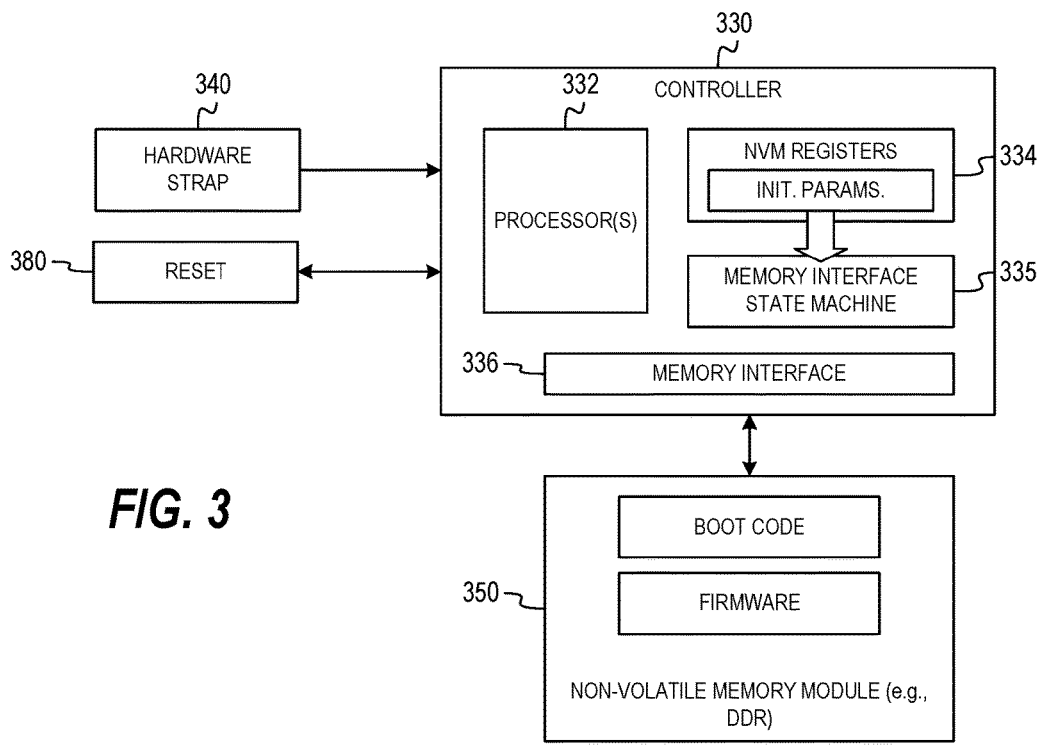
FIG. 3 is a block diagram of a computing or electronic device according to an embodiment.

FIG. 3 illustrates a block diagram of a device providing for direct loading and/or execution of firmware and/or boot code from a non-volatile memory module 350 coupled to a controller 330 over a memory interface 336 that requires initialization and/or training for communication therewith. The device includes a controller 330 having one or more processors 332 and a memory interface 336 for communicating with a non-volatile memory module 350. Unlike the device of FIG. 2, in which the controller 230 is coupled to an external volatile memory module 250 over the memory interface 236, the memory module 350 of FIG. 3 is a non-volatile memory. However, similarly to embodiments described above, the non-volatile memory module 350 may comprise DDR memory, and therefore may provide relatively high speed access to data stored therein. The non-volatile memory module 350 stores the data in a persistent, rather than a volatile, manner, which may provide certain benefits as described herein.

The non-volatile memory module 350 may further serve as main memory for the device, which may advantageously result in the device benefitting from non-volatile system memory. In certain embodiments, the non-volatile memory module 350 is a direct-attached module mounted (e.g., soldered) to a PCB to which the controller 330 is likewise mounted.

In certain embodiments, the controller 330 is configured to boot from the non-volatile memory module 350, which is pre-loaded with boot code and firmware for execution by the controller 330; that is, after a power cycle, the first instructions executed by the processor(s) 332 may be from the non-volatile memory 350 (e.g., DDR-attached device). The processor(s) 332 may effectively be idle until the memory interface 336 is trained according to one or more methods disclosed herein. Once the memory interface 336 is trained, it may be possible for the controller 330 to fetch the first instructions from the non-volatile memory device coupled to the controller 330 over the interface 336.

In order to be able to train the memory interface 336 without utilizing the processor(s), it may be necessary for the system to include additional hardware configured to execute said training. The device of FIG. 3 may include hardware strap circuitry 340 and/or reset circuitry 380, as described above in relation to FIG. 2. Furthermore, the controller 330 of FIG. 3, may include (1) one or more non-volatile hardware registers 334, which may be configured to store initialization parameter data associated with the memory interface 336, as well as (2) hardware state machine logic 335 configured to read the registers 334 and initialize/train the memory interface 336 using the data stored therein. For example, the NVM registers 334 may be programmed with initialization parameters used to initialize/train the memory interface 336, wherein the initialization parameters are loaded into the interface state machine 335.

The NVM registers 334 may comprise one or more fuses, which may be used in certain embodiments for the dual purpose of storing the aforementioned initialization parameters data and security signatures for encryption, or other data. The registers 334 (e.g., fuses) may advantageously be burned during a manufacturing process. In certain embodiments, the registers 334 are one-time programmable devices. The registers 334 may therefore have the initialization parameter data and/or other data (e.g., security data) hard-coded therein. The NVM registers 334 may further include redundancy copies of at least some of the data stored therein. The controller 330 may be configured to read the initialization parameters from the NVM registers 334 while the processor(s) are held in reset. Although the registers 334 are described herein as comprising hardware registers, it should be understood that other types of non-volatile storage may be used within the scope of embodiments disclosed herein.

Because the device hardware substantially autonomously implements the initialization/training of the memory interface 336, it may be unnecessary for the boot code stored in the non-volatile memory module 350 to include memory interface initialization/training code for such purpose. On start-up, the hardware strap circuitry 340 may direct the controller 330 to read the initialization parameters from NVM registers 334 into the state machine 335 and use the parameters to perform the training operations. The hardware strap data and/or data stored in the NVM registers 334 may further direct the controller to release the processor(s) 332 from reset and jump to the boot code and/or firmware in the non-volatile memory module 350 over the newly-operable memory interface post training (e.g., DDR). As shown, the system of FIG. 3 may leave absent a separate boot flash external to the controller 330, including one or more associated pins. Since booting is performed only from the internal hardware and the attached non-volatile memory 350, the boot up process may require fewer stages than other systems, thereby potentially speeding up boot time.

The state machine circuitry 335 is designed and/or configured to initialize and/or train the memory interface using the initialization parameter data, which may be provided thereto from the one or more NVM registers 334. Therefore, rather than using coded algorithm(s), the controller 330 utilizes a hardware state machine to implement interface initialization/training logic.

Firmware Execution Processes

Figure 4:
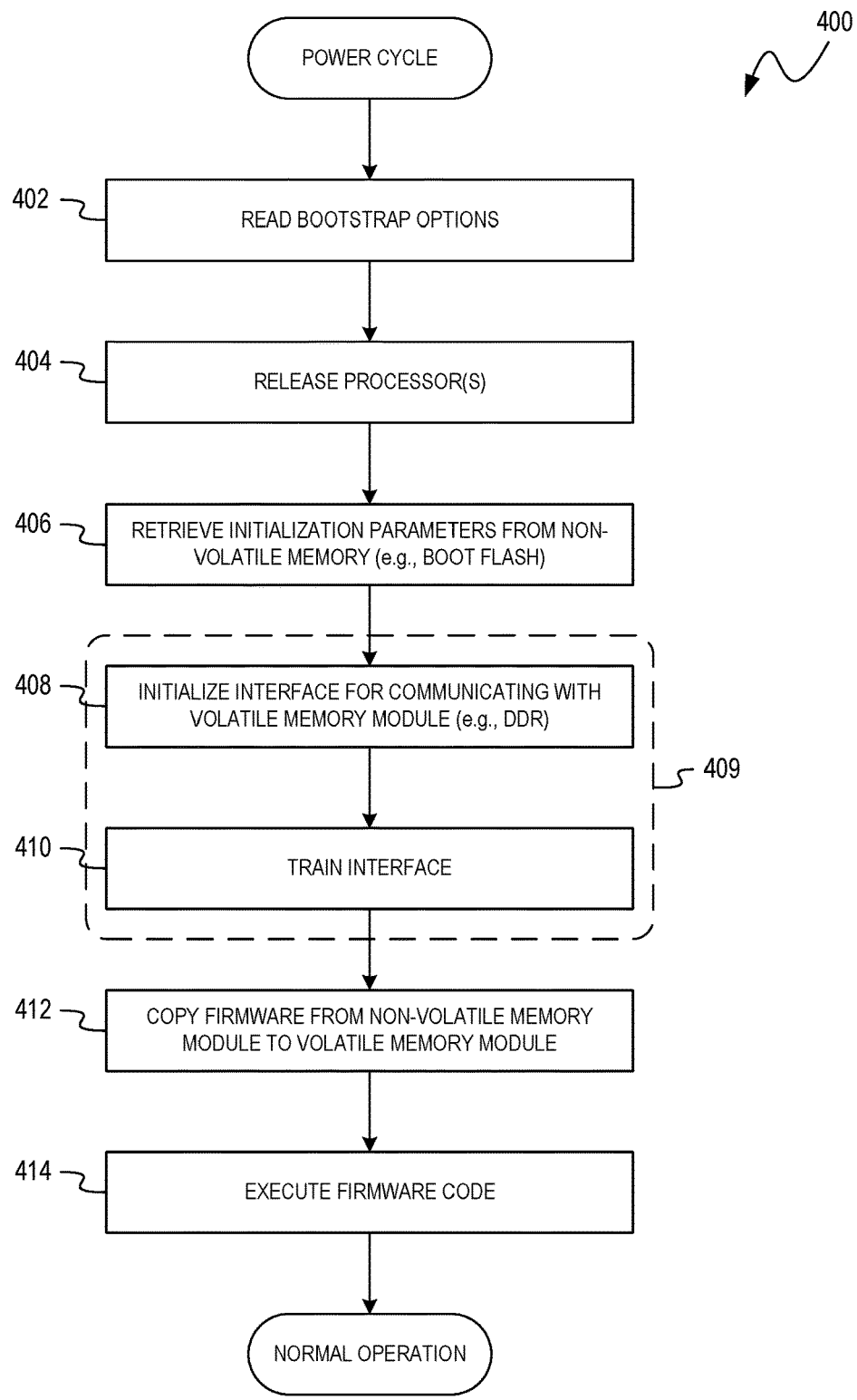
FIG. 4 is a flow diagram illustrating a process for executing firmware in a computing or electronic device according to an embodiment.

FIG. 4 illustrates a process 400 for executing firmware in a computing or electronic device according to one or more embodiments. As shown, the process 400 may be executed after a power cycle. In one embodiment the process 400 involves first reading bootstrap options at block 402. For example, a state machine in hardware of a computing device may read bootstrap options prior to the relevant processor(s) being released from reset. The bootstrap data may direct the controller as to which chip selects are to be activated.

At block 404, the process 400 involves releasing one or more processors in order to execute initialization/boot code using the processor(s). The one or more processors (e.g., microprocessors) may be components of a controller (e.g., SoC). The processor(s) may be released at least in part by releasing one or more reset lines coupled to the controller/processor(s). In certain embodiments, the process 400 further involves initializing an interface associated with an external boot device (e.g., SPI interface).

At block 406, the process 400 involves retrieving initialization parameters from non-volatile memory, such as a boot flash module coupled to a controller over a communication interface. The processor(s) may determine where to fetch the initialization parameters and/or boot code based on the bootstraps read at block 402. In certain embodiments, the initialization parameters, as well as possibly second stage boot code, are retrieved from an external boot device, such as a SPI flash chip. The second stage boot loader image may include the initialization parameters as well as the firmware image for the device.

The process 400 further involves communicating with a volatile memory module coupled to the controller over a memory interface (e.g., DDR). However, in order to communicate with the volatile memory module, it may first be necessary to initialize and/or train the associated memory interface. At block 408, the one or more released processors may be used to initialize the interface using the previously-retrieved initialization parameters. The interface may further be trained at block 410. Whereas the initialization process may be based on pre-defined configuration starting point data, subsequent training may provide further fine tuning for configuration of the interface. The initialization/training blocks (collectively 409) may be performed at least in part by the processor(s), which were previously released from reset. For example, such processes may be directed by code stored in internal volatile SRAM memory of the controller.

Once the interface has been initialized and trained, the process 400 may involve copying firmware from the external non-volatile memory to the volatile memory module at block 412. For example, the firmware may be copied from a NOR flash chip to a DDR memory coupled to the controller through the initialized interface.

At block 414, the copied firmware may then be executed from the volatile memory module, after which the system or device may be configured to operate under normal operation. For example, the processor(s) may jump to the copied firmware in attached DDR memory and execute the code, after which the device may be substantially operational.

Figure 5:
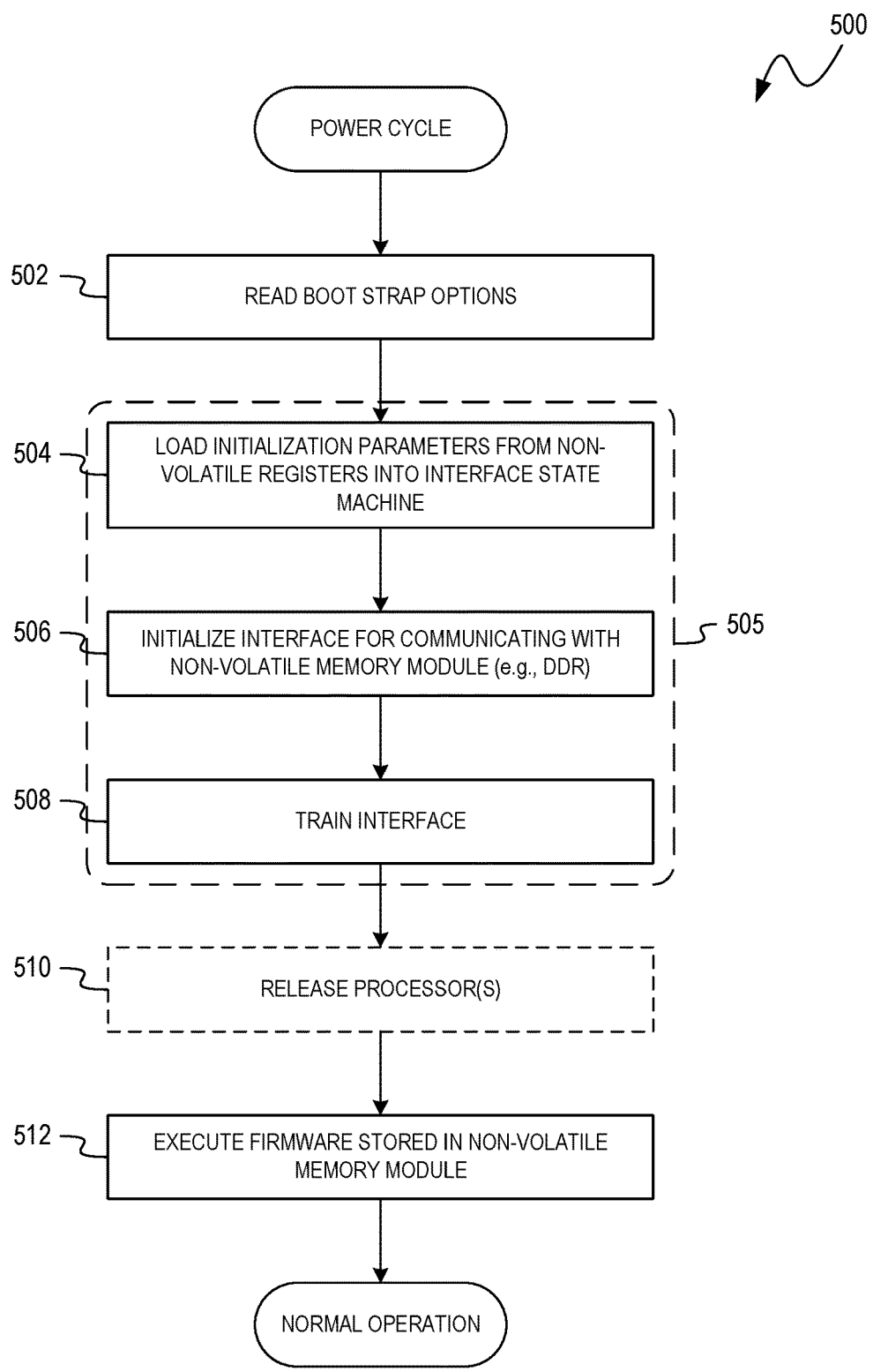
FIG. 5 is a flow diagram illustrating a process for executing firmware in a computing or electronic device according to an embodiment.

FIG. 5 provides an illustration of a process 500 for executing firmware in a computing or electronic device according to one or more embodiments, wherein firmware may be executed directly from a non-volatile memory module coupled to a device controller over an interface without the need to first retrieve initialization parameters or data from an external non-volatile memory chip. As shown, the process 500 may be executed after a power cycle.

At block 502, bootstrap option data may be read from bootstrap hardware by hardware of a controller of a computing device, such as a data storage device. At block 504, the process 500 involves loading initialization parameters from non-volatile registers of the controller into an interface state machine. The interface state machine may comprise hardware configured to execute initialization and/or training operations for initializing and/or training an interface for communication between the controller and a non-volatile memory module coupled to the controller over the interface. The bootstrap option data may direct the controller to perform said loading, which may comprise transferring hardware fuse values into the state machine. For example, one or more strap options may enable required system interfaces.

At block 506, the process 500 involves initializing the interface using the initialization parameters and the interface state machine. While certain systems and devices may implement interface initialization according to an algorithm run by the system processor(s), in certain embodiments, the interface initialization/training blocks 505 of the process 500 are performed while the system processor(s) are held in reset, and therefore unavailable for such purposes. Therefore, in certain embodiments, the steps 505 are implemented at least in part using hardware logic and/or data storage registers of the controller.

The state machine logic that implements at least part of the blocks 505 may be embedded in the hardware. This may require an augmentation to standard controller hardware design to accommodate such functionality. Therefore, the communication interface, together with the state machine, may be considered a self-training hardware state machine.

With further reference to FIG. 5, as mentioned above, the block 508 involves training the interface. In certain embodiments, at least a portion of the operations described with reference to block 504, 506, 508 may be performed without executing firmware by processors of the controller. That is, such operations may be performed strictly using hardware devices. The interface initialization parameters may be maintained in one or more non-volatile hardware registers of the controller and executed by the state machine.

Training of the interface may involve any suitable or desirable process. For example, training may involve placing certain hardware parameters into appropriate positions within the communication interface. In certain embodiments, the process 500 includes a multi-stage training process. When a first step of training is completed successfully, as may be indicated by a status update, the process may move on to a next step.

At block 510, the process 500 may involve releasing the one or more processors of the controller only after the interface has been initialized and/or trained. With the one or more processors active, the process 500 may involve executing firmware stored in non-volatile memory connected to the controller over the interface.

Therefore, according to the process 500 as implemented in a DDR-attached memory solution, state machine logic may provide capability to perform DDR interface training without the need for code execution. With the ability to store custom DDR training parameters in the controller hardware, and with hardware state machine logic to perform initialization/training, the first data fetched by the processor(s) after a power cycle may be from a memory device attached to the DDR interface. It may be unnecessary to copy code to a DDR-attached memory that is non-volatile and stores code persistently. This provides substantial benefit since such copying can take a substantial amount of time in certain systems due to the relatively slow interface commonly associated with external boot devices.

The inclusion of one-time programmable subset of hardware registers that is used to program the DDR interface may allow for a single non-volatile memory device connected to the external DDR interface of the controller. That is, no serial NOR boot flash may need to be present to assist in the boot process.

Additional Embodiments

Those skilled in the art will appreciate that in some embodiments, other types of firmware execution systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A device comprising:
   control circuitry comprising:
   a processor;
   a memory interface;
   memory interface initialization circuitry; and
   non-volatile storage storing initialization parameters for initializing the memory interface;
   wherein the control circuitry is configured to:
   while the processor is held in reset, initialize the memory interface using the initialization parameters and the memory interface initialization circuitry;
   after the memory interface has been initialized, receive instructions from a non-volatile memory module over the memory interface; and
   after the processor has been released from reset, execute the instructions using the processor.

2. The device of claim 1, wherein the control circuitry is further configured to, while the processor is held in reset, train the memory interface using the initialization parameters and the memory interface initialization circuitry.

3. The device of claim 1, wherein the memory interface initialization circuitry comprises state machine circuitry.

4. The device of claim 1, wherein the non-volatile storage comprises one-time programmable data storage.

5. The device of claim 4, wherein the one-time programmable data storage comprises a plurality of hardware registers.

6. The device of claim 1, wherein the control circuitry comprises an application-specific integrated circuit (ASIC).

7. The device of claim 1, wherein the memory interface initialization circuitry comprises a field-programmable gate array.

8. The device of claim 1, wherein the initialization parameters indicate characteristics of a data transmission path that couples the memory interface initialization circuitry to the non-volatile memory module.

9. The device of claim 8, wherein the data transmission path is associated with a printed circuit board on which the control circuitry and the non-volatile memory module are mounted.

10. The device of claim 1, wherein the initialization parameters indicate characteristics of the non-volatile memory module.

11. The device of claim 1, wherein:
the control circuitry is further configured to, while the processor is held in reset, read bootstrap option data; and
said initializing the memory interface is based at least in part on the bootstrap option data.

12. A method of executing instructions in a device, the method comprising:
while a processor of a device is held in reset:
accessing initialization parameters stored in non-volatile storage of the device;
providing the initialization parameters to memory interface initialization circuitry; and
initializing a memory interface of the device using the initialization parameters and the memory interface initialization circuitry;
after the memory interface has been initialized, receiving instructions from a non-volatile memory module over the memory interface; and
after the processor has been released from reset, executing the instructions using the processor.

13. The method of claim 12, wherein the memory interface is a double data rate (DDR) interface.

14. The method of claim 12, wherein the non-volatile storage comprises one or more hardware registers.

15. The method of claim 14, wherein the one or more hardware registers comprise one or more fuses burned during a manufacturing process.

16. The method of claim 12, further comprising, while the processor is held in reset, reading bootstrap option data, wherein said initializing the memory interface is based at least in part on the bootstrap option data.

17. The method of claim 12, further comprising, while the processor is held in reset, training the memory interface using the initialization parameters and the memory interface initialization circuitry.

18. The method of claim 12, wherein the memory interface initialization circuitry comprises state machine circuitry.

19. The method of claim 12, wherein:
the initialization parameters indicate characteristics of a data transmission path that couples the memory interface initialization circuitry to the non-volatile memory module; and
the data transmission path is associated with a board on which the memory interface is mounted.

20. A data storage device comprising:
a non-volatile memory module; and
control circuitry comprising:
a processor;
a memory interface;
memory interface initialization circuitry; and
non-volatile storage storing initialization parameters for initializing the memory interface;
wherein the control circuitry is configured to:
while the processor is held in reset, initialize the memory interface using the initialization parameters and the memory interface initialization circuitry;
after the memory interface has been initialized, receive instructions from the non-volatile memory module over the memory interface; and
after the processor has been released from reset, execute the instructions using the processor.

* * * * *